United States Patent [19]

Borkowski

[11] Patent Number: 5,390,768
[45] Date of Patent: Feb. 21, 1995

[54] MANUALLY ACTUATED HYDRAULIC BRAKE DEVICE FOR USE WITH A VEHICLE SURGE BRAKE SYSTEM

[76] Inventor: Paul A. Borkowski, 56385 Westlea Dr., South Bend, Ind. 46619

[21] Appl. No.: 85,291

[22] Filed: Jun. 30, 1993

[51] Int. Cl.⁶ .......................... B60T 7/20; B60T 11/00
[52] U.S. Cl. ................. 188/112 R; 188/353; 70/179; 70/180; 137/383; 251/114
[58] Field of Search ............. 188/112 R, 353; 70/176, 70/177, 179, 180, 242; 137/384.2, 384.4, 383; 251/114

[56] References Cited

U.S. PATENT DOCUMENTS

| | | | |
|---|---|---|---|
| 2,659,242 | 11/1953 | Blanning | 70/180 X |
| 2,704,585 | 3/1955 | Stromberg | 188/122 R X |
| 2,869,581 | 1/1959 | Perez | 188/353 X |
| 3,505,815 | 4/1970 | Wherry | 188/112 R X |
| 4,633,686 | 1/1987 | Carr | 70/179 |
| 4,721,192 | 1/1988 | Cano et al. | 188/353 |
| 4,881,615 | 11/1989 | Conway | 180/287 |
| 4,934,492 | 6/1990 | Hayes-Sheen | 188/353 |
| 4,951,776 | 8/1990 | Jeter | 180/287 |

FOREIGN PATENT DOCUMENTS

| | | | |
|---|---|---|---|
| 227551 | 12/1984 | Japan | 188/353 |
| 2117069 | 10/1983 | United Kingdom | 188/353 |

Primary Examiner—Robert J. Oberleitner
Assistant Examiner—Kevin D. Rutherford
Attorney, Agent, or Firm—James D. Hall

[57] ABSTRACT

The present invention involves a hydraulic device for immobilizing the wheel of a stationary trailer. The locking brake is spliced into a brake line of a trailer carrying a surge brake system and allows an individual to manually activate the trailer brake when the trailer is stopped. The brake device includes a housing block with a cylindrical bore and a spring biased piston. A shank is connected to the piston and provides a manual handle for shifting the position between an inner and outer position. In the outer position, brake fluid may flow from the brake system actuating device. In its inner position, brake fluid is prevented from flowing from the actuating device and is pressurized to lock each brake. The housing block also includes a pivotally secured lock pin which engages a hole on the shank to secure the shank to the housing block. In this manner, the brakes of the trailer may be secured in a locked position.

9 Claims, 2 Drawing Sheets

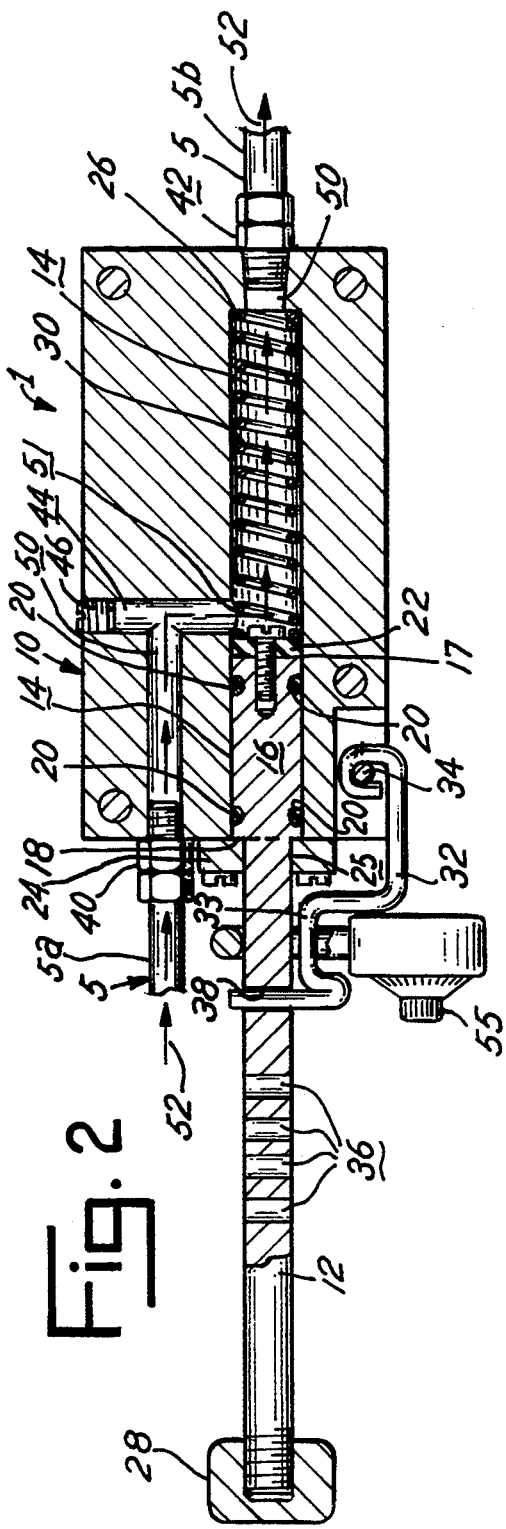
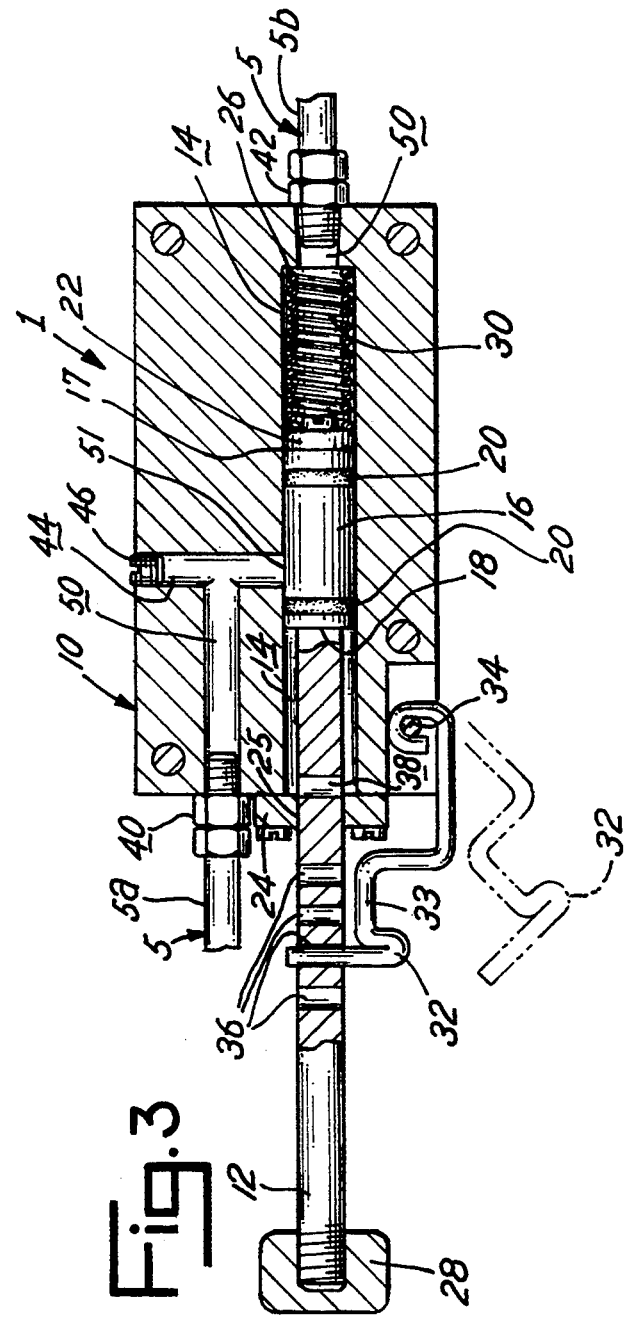

MANUALLY ACTUATED HYDRAULIC BRAKE DEVICE FOR USE WITH A VEHICLE SURGE BRAKE SYSTEM

FIELD OF THE INVENTION

This invention relates to a manually actuated hydraulic brake device for locking the wheels of a stationary trailer by utilizing the trailer's surge brake system.

BACKGROUND OF THE INVENTION

Typically, trailers used to transport boats, recreational homes and other such objects weighing sometimes up to 10,000 pounds are equipped with a surge brake system. A surge brake system utilizes a spring biased piston actuator that moves relative to the trailer when the towing vehicle decelerates to force brake fluid into the wheel brakes, and thus slowing the trailer. However, when the towing vehicle and trailer are motionless or stopped, the surge brake system is not actuated and the trailer's brakes are not engaged.

Hence, a parked trailer with a surge brake system must be immobilized against rolling down a sloped surface by keeping the trailer hitched to the towing vehicle or by blocking the trailer's wheels. But when the trailer greatly outweighs the towing vehicle, it may drag the hitched towing vehicle down a sloped surface. Blocking the trailer's tires may not always be effective due to the type of block used or the surface upon which the trailer rests.

SUMMARY OF THE INVENTION

This invention alleviates the above mentioned problems of trying to secure the trailer against undesired movement by utilizing the trailer's surge brake system. In this invention, a device is provided which splices into the surge brake system fluid line and allows an individual to hydraulically lock the trailer's wheels into place by manually actuating the brake system.

An additional feature of this invention is its theft deterrent and safety characteristics. The brake device can be secured into its brake mode to prevent an unauthorized person from disengaging the trailer's brakes. Thus, a small child could not cause the trailer to roll down a hill. Nor could a thief similarly disengage the brake system and hitch the trailer to a get-a-way vehicle and thereby, drive off with the trailer.

Furthermore, this invention is an inexpensive alternative to electronic trailer brake systems. A distinguishing characteristic is that this manually actuated hydraulic brake device is self-contained. It can be used around water such as when the trailer is used as a boat trailer and must enter water to discharge or receive a boat. Electronic brake systems are either rendered inoperative or require special waterproofing when submerged.

Accordingly, it is an object of this invention to provide a means for locking the wheels of a stationary trailer by utilizing the trailer's surge brake system.

Additionally, it is the object of this invention to deter theft and to provide for a safe means to park and/or unload a trailer.

Furthermore, it is an object of this invention to have a self-contained braking device for use around water.

Other objects of this invention will become apparent upon a reading of the following description.

BRIEF DESCRIPTION OF THE DRAWINGS

FIG. 2 is a longitudinal sectional view of the brake device in its disengaged position.

FIG. 3 is a longitudinal-sectional view of the brake device invention in the engaged position.

DESCRIPTION OF THE PREFERRED EMBODIMENT

Figure 1:
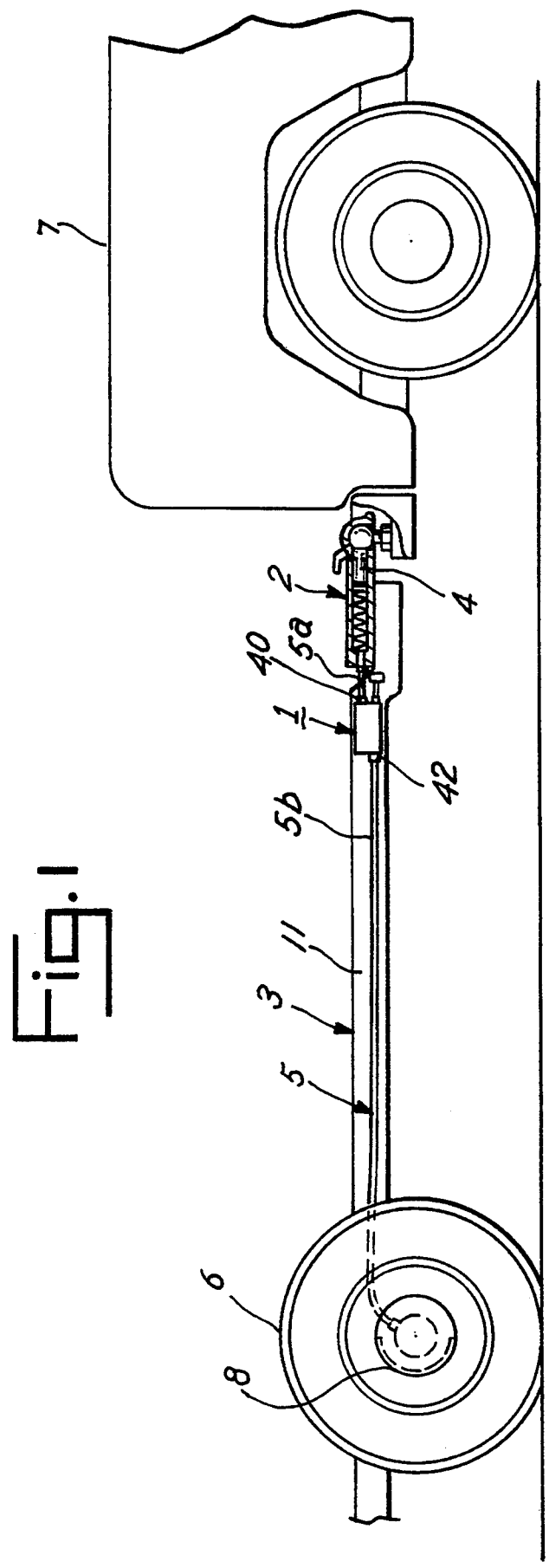
FIG. 1 is an elevational view of the brake device of this invention spliced into a surge brake system of a trailer connected to a towing vehicle.

The preferred embodiment herein described is not intended to be exhaustive or to limit the application to the precise form disclosed. It is chosen and described to best explain the principles of the invention and its application and practical use to thereby enable others skilled in the art to utilize the invention.

The hydraulic brake device or assembly 1 shown in the drawings is preferably adapted for trailers that use a surge brake system 2, or any other similar brake system that has an accessible brake line. Surge brake system 2 is of a common construction and includes a brake line 5 filled with brake fluid, a spring biased piston actuator 4, and a shoe or pad brake 8 for each trailer wheel 6 carried by frame 11 of trailer 3. Surge brake system 2 typically operates when the towing vehicle 7 decelerates and the forward momentum of trailer 3 pushes it against towing vehicle 7. This causes spring biased piston actuator 4 to pump brake fluid through brake line 5 into shoe brake 8 of each trailer wheel 6, and thus applying each brake and slowing trailer 3.

Device 1 is attached to trailer 3 and splices into surge brake line 5, as shown in FIG. 1. The brake line 5 is interrupted and the forward section of the brake line 5a is connected to the forward splice port 40 of device 1, and the aft section of the brake line 5b is connected to the aft splice port 42 of device 1.

Device 1, as shown in FIG. 2, includes a housing block 10 which contains a cylindrical piston bore 14. A brake fluid flow passage 50 connects into piston bore 14 at an intermediate bore location 51 and a bleed hole 44 connects into fluid passage 50. Aft splice port 42 extends into the aft end of the piston bore 14. Forward splice port 40 is part of fluid passage 50 and forms the location of the fluid passage 50 into block 10. Fluid passage 50 and piston bore 14 create a fluid flow path 52 for the brake fluid between forward brake line 5a and aft brake line 5b.

A piston 16 is fitted into the piston bore 14. Low friction sealing rings 20 are carried by piston 16 so as to create a minimal interference fit of the piston 16 within the piston bore 14. A hydraulic seal 22 is affixed to the front end 17 of piston 16. A shank 12 extends coaxially from the rear end of the piston 16 outwardly from the housing block 10. Piston 16 is prevented from being removed from piston bore 14 by a retainer plate 24. Retainer plate 24 is connected to the housing block 10 and has an opening 25 which accommodates shank 12, but not the larger diameter of piston 16. A grip 28 is connected to the extended end of shank 12.

A helical return spring 30 is located inside the piston bore 14 between a restraining shoulder 26 formed at aft port 42 and hydraulic seal 22 of piston 16, as shown in FIGS. 2 and 3. Return spring 30 can be compressed between restraining shoulder 26 and piston 16 by applying approximately fifteen (15) psi of force to shank 12 in the direction of block 10.

A lock pin 32, manufactured of high tensile strength spring steel, is pivotally connected to housing block 10 at a pivot connection 34 near retainer plate 24. Shank 12 has a series of engagement holes 36 and a spaced disengagement hole 38 adapted to receive lock pin 32 formed in it.

The hydraulic brake device 1 is operated as follows to immobilize the wheels of a stationary trailer. Lock pin 32 is removed from disengagement hole 38 to allow movement of piston 16. Piston 16 is plunged into piston bore 14 compressing return spring 30 by manually exerting a longitudinal pushing force on grip 28. As piston 16 is shifted from its outer position as seen in FIG. 2 into its inner position as seen in FIG. 3, brake fluid entrappeal in fluid passage 50 between piston 16 and restraining shoulder 26 is forced out of housing block 10 by the piston through aft splice port 42 and aft brake line 5b into shoe brake 8 to set the brake and immobilize each trailer wheel 6. Piston 16 is then secured in its inner position by inserting lock pin 32 into the nearest engagement hole 36, as shown in FIG. 3. Piston 16 blocks passage 50 and maintains sufficient pressure upon the brake fluid in aft brake line 5b to lock each brake. Lock pin 32 is slightly flexed when inserted in a hole 36 so as to create a spring force which prevents the lock pin 32 from dropping out of the hole 36. Multiple holes 36 are provided to accommodate brake wear.

Each shoe brake 8 may be released from its trailer wheel 6 by removing lock pin 32 from engagement hole 36 as shown in broken lines in FIG. 3, whereupon return spring 30 will expand to force piston 16 away from the restraining shoulder 26. As piston 16 moves under the influence of spring 30 from its inner position seen in FIG. 3 to its outer position seen in FIG. 2, fluid passage 50 is reopened to allow reverse flow of the brake fluid, thus relieving the pressure upon each brake 8 to release its trailer wheel 6. Once piston 16 no longer obstructs fluid passage 50, an unobstructed brake path 52 is created for the normal operation of surge brake-system 2.

When piston 16 is in either of its outer position or inner position with pin 32 inserted into a hole 36, 38, the piston can be immobilized from movement by affixing a lock 55 around the lock pin neck 33 and shank 12, as seen in FIG. 2, to prevent the lock pin from being removed from hole 36, 38.

Bleed hole 44 is used to bleed air out of device 1 and brake line 5. Bleed hole 44 can also be used to fill device 1 and brake line 5 with brake fluid as required. A plug 46 is threaded into housing block 10 at bleed hole 44 to seal the hole 44.

It is understood that the above description does not limit the invention to those details, but may be modified within the scope of the appended claims.

I claim:

1. In combination a trailer with a surge brake system and brake locking device, said trailer including a frame and wheels, said surge brake system carried by said trailer frame including a brake for each wheel and actuating means connected by a brake fluid line to each brake for actuating each brake to restrict movement of its associated wheel upon a reduction in forward momentum of said trailer, said brake device connected into said brake fluid line and including means manually operable independently of said actuating means for pressurizing the brake fluid in said brake fluid line to lock each brake to immobilize its associated wheel, said brake device including a housing block having a cylindrical bore with piston means therein, said brake line connected to said housing block so as to place said cylindrical bore in brake fluid communication with each brake, said piston means forming a part of said manually operable means and being shiftable between inner and outer positions within said bore, said piston means when in its outer position for permitting said brake fluid flow to each brake under the influence of said actuating means, said piston means when in its inner position for pressurizing said brake fluid to each brake to lock the brake and block said brake fluid line to isolate said actuating means from each brake, an accessible shank connected to said piston means, said shank constituting handle means for shifting said piston means between its inner and outer positions;

lock means releasably connected between said shank and housing block for securing said piston means in one of its said inner and outer positions;

said lock means including a lock pin, said lock pin pivotally connected to said housing block, said shank having a hole therein, said lock pin fitted into said hole to secure the shank to the housing block.

2. The combination of claim 1 wherein said lock means includes a lock device surrounding said lock pin and shank to prevent the lock pin from being removed from said shank hole.

3. In combination a trailer with a surge brake system and brake locking device, said trailer including a frame and a plurality of wheels, said surge brake system carried by said trailer frame including a brake associated with each said wheel, and actuating means for actuating each said brake connected by a brake fluid line to each said brake to restrict movement of said associated wheel upon a reduction in forward momentum of said trailer, said brake locking device connected into said brake fluid line and including piston means for opening and closing said brake fluid line, said piston means also for pressurizing brake fluid in said brake fluid line to lock each said brake and immobilize said associated wheel, said brake locking device further including an accessible shank connected to said piston means and a pivotally disposed lock pin, said shank including a hole and said lock pin being engageable with said hole to secure the position of said piston means closing and pressurizing said brake fluid line.

4. The combination of claim 3 wherein said locking brake device includes a housing block having a cylindrical bore receiving said piston means, said brake fluid line connected to said housing block so as to place said cylindrical bore in fluid communication with each said brake, said piston means being shiftable between inner and outer positions within said bore, said piston means in its outer position allowing brake fluid to flow to each said brake under the influence of said actuating means, and said piston in its inner position pressurizing brake fluid in said brake fluid line to lock each said brake.

5. The combination of claim 4 wherein said piston means in said outer position prevents brake fluid flow from said actuating means to isolate said actuating means from each said brake.

6. The combination of claim 4 wherein said shank includes handle means for manual activation of said piston means between said inner and outer positions.

7. The combination of claim 4 wherein said lock pin is releasably connected to between said shank and said housing block for securing said piston means.

8. The combination of claim 4 further comprising spring means within said cylindrical bore in contact with said piston means for normally urging said piston means into said outer position.

9. The combination of claim 3 further comprising a lock device surrounding said lock pin and shank to prevent said lock pin from being removed from said shank hole.

* * * * *